United States Patent
McCloy (10) Patent No.: US 11,940,030 B1
(45) Date of Patent: Mar. 26, 2024

(54) TORQUE-LIMITING TORSION GIMBAL

(71) Applicant: BorgWarner Inc., Auburn Hills, MI (US)

(72) Inventor: Chad M. McCloy, Cortland, NY (US)

(73) Assignee: BORGWARNER INC., Auburn Hills, MI (US)

( * ) Notice: Subject to any disclaimer, the term of this patent is extended or adjusted under 35 U.S.C. 154(b) by 11 days.

(21) Appl. No.: 17/971,814

(22) Filed: Oct. 24, 2022

(51) Int. Cl.
  *F16D 7/00* (2006.01)
  *F16H 61/12* (2010.01)

(52) U.S. Cl.
  CPC ............... *F16D 7/00* (2013.01); *F16H 61/12* (2013.01); *F16H 2061/124* (2013.01)

(58) Field of Classification Search
  CPC ....... F16D 7/00; F16H 61/12; F16H 2061/124
  USPC .......................................................... 74/335
  See application file for complete search history.

(56) References Cited

U.S. PATENT DOCUMENTS

| | | | |
|---|---|---|---|
| 4,056,953 A | 11/1977 | Furlette et al. | |
| 4,263,711 A | 4/1981 | Sakano et al. | |
| 4,617,484 A | 10/1986 | Buijsen | |
| 4,687,392 A | 8/1987 | Bidwell | |
| 5,117,784 A * | 6/1992 | Schechter | F01L 1/352 |
| | | | 123/90.31 |
| 5,680,836 A * | 10/1997 | Pierik | F16H 35/008 |
| | | | 123/90.31 |
| 5,684,348 A | 11/1997 | Main | |
| 6,039,016 A * | 3/2000 | Noguchi | F01L 1/3442 |
| | | | 123/90.31 |
| 6,443,846 B1 | 9/2002 | Dziedzic et al. | |
| 6,608,421 B1 | 8/2003 | Hamilton et al. | |
| 6,720,702 B2 | 4/2004 | Knauff | |
| 6,948,464 B2 | 9/2005 | Ido et al. | |
| 8,083,596 B1 | 12/2011 | Silver et al. | |
| 9,810,108 B2 * | 11/2017 | Pritchard | F01L 1/352 |
| 2006/0236965 A1 * | 10/2006 | Schaefer | F01L 1/352 |
| | | | 123/90.17 |

(Continued)

FOREIGN PATENT DOCUMENTS

| | | |
|---|---|---|
| DE | 2638538 A1 | 3/1978 |
| FR | 2497018 A1 | 6/1982 |

(Continued)

*Primary Examiner* — Ha Dinh Ho
(74) *Attorney, Agent, or Firm* — REISING ETHINGTON P.C.

(57) ABSTRACT

A torque-limiting torsion gimbal for connecting an electric motor to a camshaft phaser includes an elongated body configured to extend from an end of a motor shaft of the electric motor to an input of a planetary gear assembly of the camshaft phaser; an angular-displacement-resistant end of the elongated body configured to engage an end of the motor shaft; and a key, positioned at another end of the elongated body opposite to the angular-displacement-resistant end, and configured to be received within and engage a slot at the input of the planetary gear assembly of the camshaft phaser to transmit torque from the electric motor to the planetary gear assembly; the elongated body prevents an angular displacement of the motor shaft relative to the input of the planetary gear assembly and permits the angular displacement of the motor shaft relative to the input of the planetary gear assembly when a mechanical stop of the camshaft phaser is engaged.

9 Claims, 5 Drawing Sheets

(56) References Cited

U.S. PATENT DOCUMENTS

| | | | | |
|---|---|---|---|---|
| 2007/0169731 A1* | 7/2007 | Farah | ................... | F16H 35/008 |
| | | | | 123/90.17 |
| 2009/0120388 A1* | 5/2009 | Lee | ....................... | F01L 1/352 |
| | | | | 123/90.11 |
| 2013/0312682 A1 | 11/2013 | Schaefer et al. | | |
| 2015/0315939 A1* | 11/2015 | Showalter | .............. | F01L 1/352 |
| | | | | 29/893.2 |
| 2016/0245088 A1 | 8/2016 | Jevardat De Fombelle et al. | | |

FOREIGN PATENT DOCUMENTS

| | | | |
|---|---|---|---|
| GB | 1533026 | A | 11/1978 |
| JP | 5873523 | B2 | 3/2016 |
| WO | WO2010-129539 | A2 | 11/2010 |
| WO | WO2012110131 | A1 | 8/2012 |

\* cited by examiner

TORQUE-LIMITING TORSION GIMBAL

TECHNICAL FIELD

The present application relates to camshaft phasers and, more particularly, to electric motors controlling the camshaft phasers.

BACKGROUND

Vehicles can include electric motors that carry out a variety of vehicle functions, including, for example, adjusting the angular position of one or more camshafts with respect to the angular position of a crankshaft or adjusting the position of a passenger or driver seat. Electric motors can be used to operate a camshaft phaser to advance or retard the timing of a camshaft with respect to the crankshaft. The camshaft phaser may include a gearbox that is driven by an electric motor. Mechanical stops that limit the range of authority of the camshaft phaser can be included in the gearbox. When the camshaft phaser reaches an end of the range, gearbox movement can be stopped relatively abruptly and a relatively large amount of torque may be applied to the output shaft of the electric motor. This relatively large amount of torque may cause unwanted stress to the camshaft phaser and it would be helpful to reduce this stress.

SUMMARY

In one implementation, a torque-limiting torsion gimbal for connecting an electric motor to a camshaft phaser includes an elongated body configured to extend from an end of a motor shaft of the electric motor to an input of a planetary gear assembly of the camshaft phaser; an angular-displacement-resistant end of the elongated body configured to engage an end of the motor shaft; and a key, positioned at another end of the elongated body opposite to the angular-displacement-resistant end, and configured to engage the input of the planetary gear assembly of the camshaft phaser to transmit torque from the electric motor to the planetary gear assembly; the elongated body prevents an angular displacement of the motor shaft relative to the input of the planetary gear assembly and permits the angular displacement of the motor shaft relative to the input of the planetary gear assembly when a mechanical stop of the camshaft phaser is engaged.

DETAILED DESCRIPTION

An elongated torque-limiting torsion gimbal can couple a motor shaft of an electric motor to a gear assembly of a variable camshaft timing (VCT) device—also called a camshaft phaser. The torsion gimbal can include an elongated body fixed to one end of a motor shaft and pivotably received by an input to the gearbox thereby communicating the torque or rotational motion generated by the electric motor through the motor shaft to the input of the gear assembly of the camshaft phaser. During normal operation, the torsion gimbal can maintain an angular position of the motor shaft relative to the input of the gear assembly. When the camshaft phaser reaches a limit of its range of authority, such that mechanical stops are engaged, the torsion gimbal can momentarily deform in response to applied torque from the motor shaft on the gear assembly to gradually permit an angular displacement of the motor shaft relative to the input of the gear assembly by permitting a twisting motion along its elongated body. Once the gear assembly of the camshaft phaser disengages from the mechanical stops and/or no more torque is applied to the torsion gimbal by the motor shaft, the gimbal can return to its default shape and reestablish a default angular relationship between the motor shaft and the input to the gear assembly. The torsion gimbal can also include a key formed at a distal end that is configured to be received in a slot formed in an input of the gear assembly. The key and slot combination can permit an axis of rotation of the motor shaft to deviate angularly from an axis of rotation of the gearbox.

Figure 1:
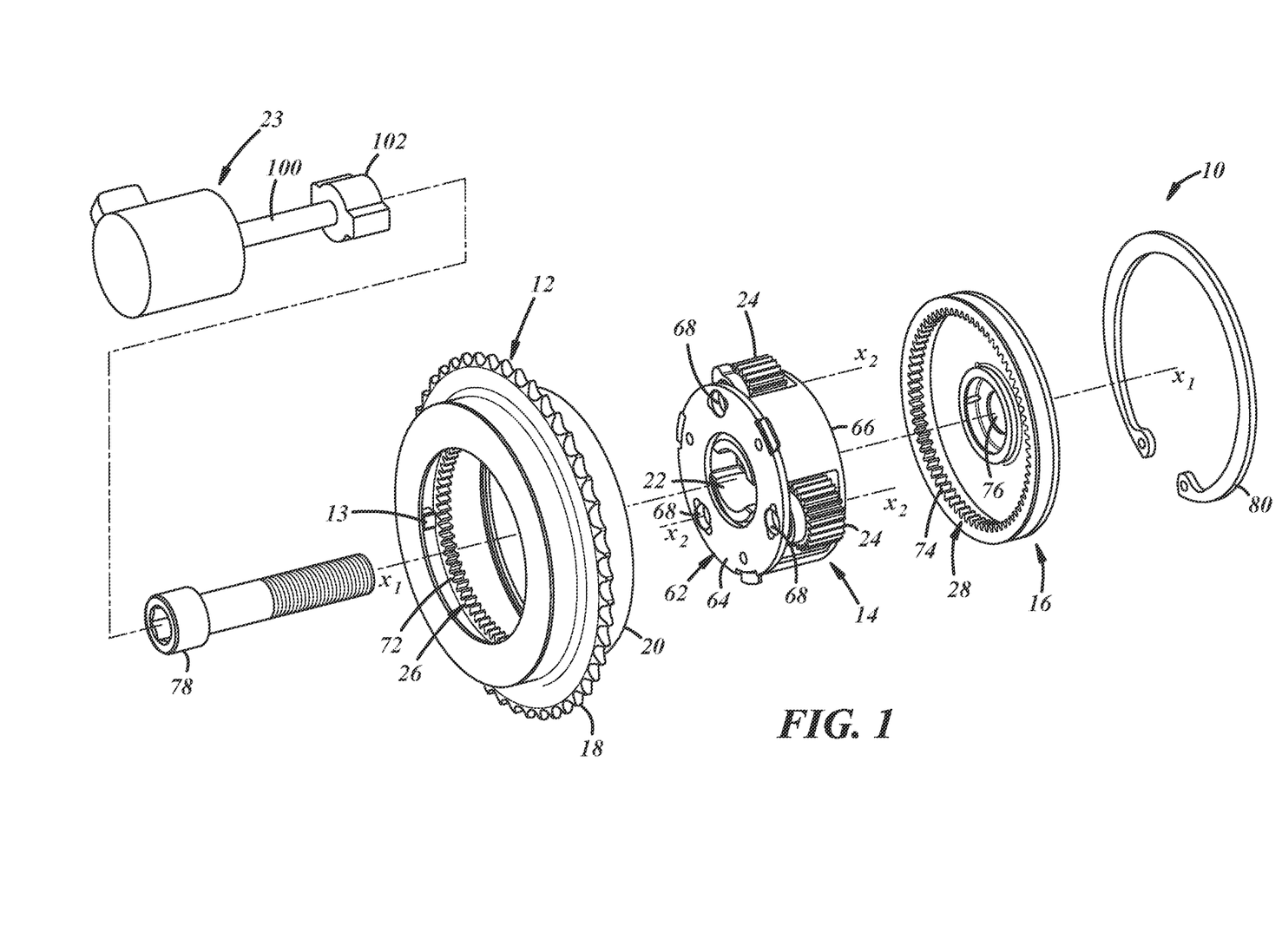
FIG. 1 is a perspective exploded view depicting an implementation of an electrically-actuated variable camshaft timing (VCT) assembly.
Figure 2:
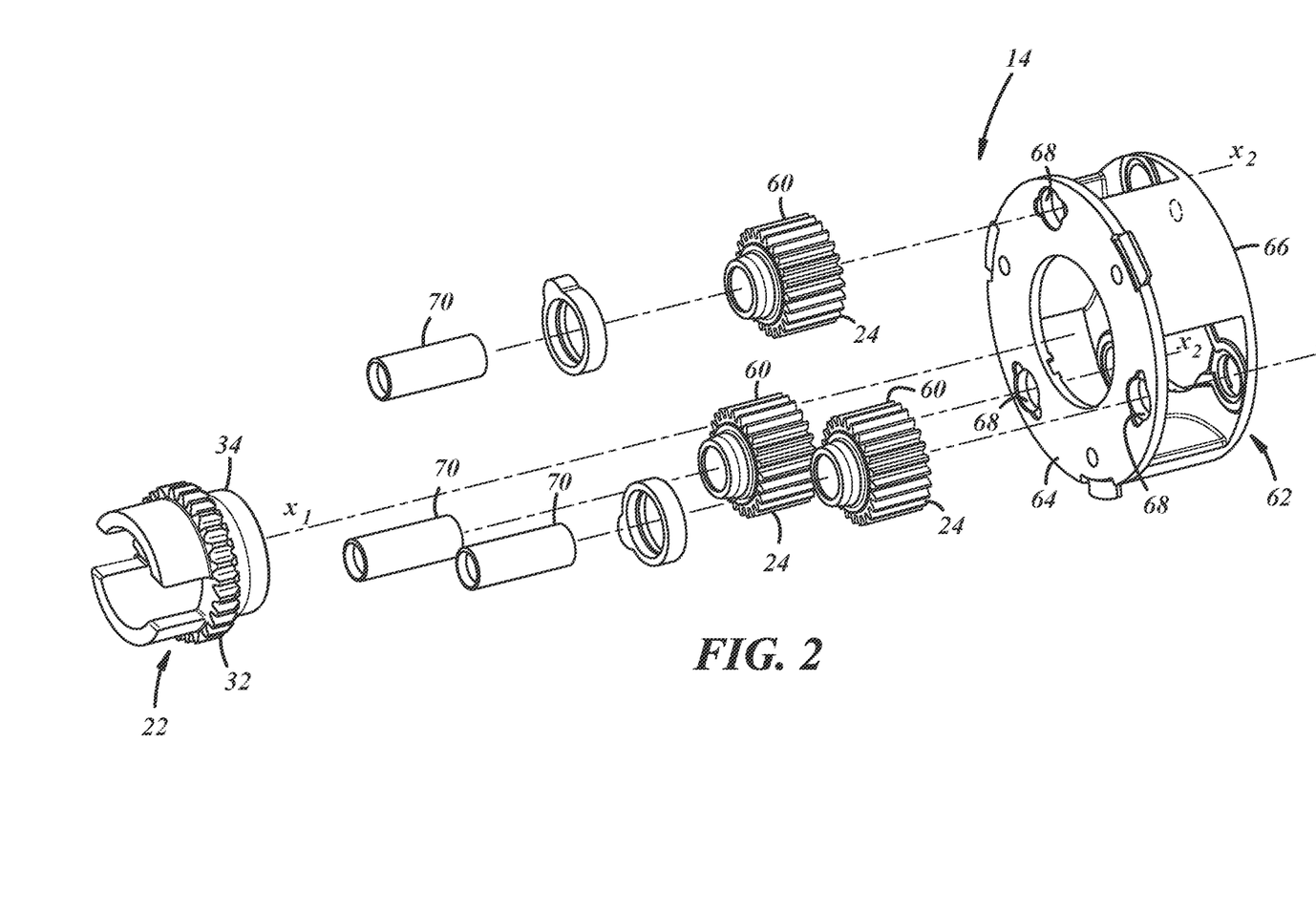
FIG. 2 is a perspective exploded view depicting a portion of an implementation of an electrically-actuated VCT assembly.
Figure 3:
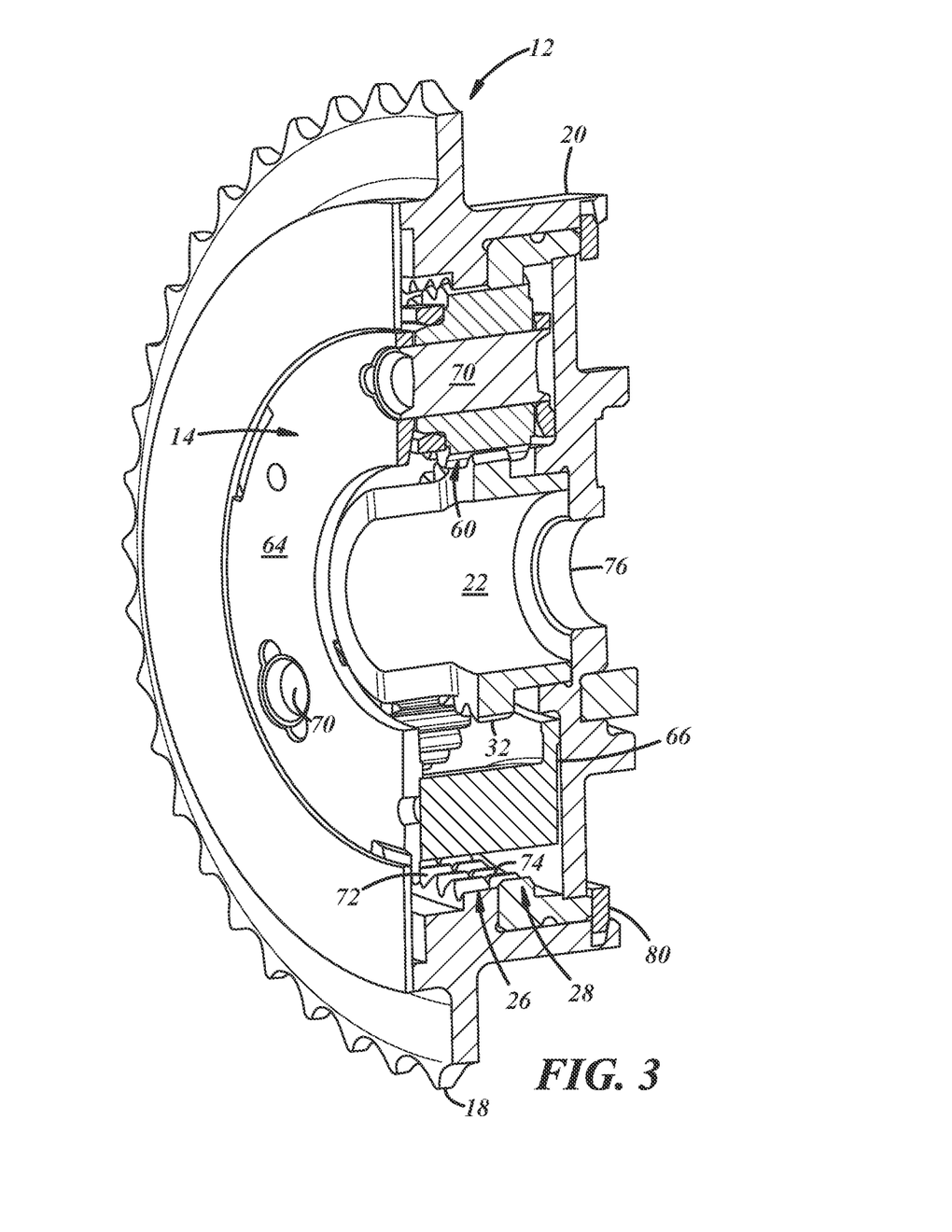
FIG. 3 is a cross-sectional view depicting an implementation of an electrically-actuated VCT assembly.

An embodiment of an electrically-actuated VCT assembly 10 (also referred to as an electrically-actuated camshaft phaser or "phaser") is shown with respect to FIGS. 1-3. The phaser 10 is a multi-piece mechanism with components that work together to transfer rotation from the engine's crankshaft and to the engine's camshaft, and that can work together to angularly displace the camshaft relative to the crankshaft for advancing and retarding engine valve opening and closing. The phaser 10 can have different designs and constructions depending upon, among other possible factors, the application in which the phaser is employed and the crankshaft and camshaft that it works with. In the embodiment presented in FIGS. 1-3, for example, the phaser 10 includes a sprocket 12, a planetary gear assembly 14, and a camshaft plate or plate 16.

The sprocket 12 receives rotational drive input from the engine's crankshaft and rotates about an axis $x_1$. A timing chain or a timing belt can be looped around the sprocket 12 and around the crankshaft so that rotation of the crankshaft translates into rotation of the sprocket via the chain or belt. Other techniques for transferring rotation between the sprocket 12 and crankshaft are possible. Along an outer surface, the sprocket 12 has a set of teeth 18 for mating with the timing chain, with the timing belt, or with another component. In different examples, the set of teeth 18 can include thirty-eight individual teeth, forty-two individual teeth, or some other quantity of teeth spanning continuously around the circumference of the sprocket 12. As illustrated, the sprocket 12 has a housing 20 spanning axially from the set of teeth 18. The housing 20 is a cylindrical wall that surrounds part of the planetary gear assembly 14.

A planetary gear stop 13 can be included on an inwardly-facing surface of the sprocket 12 to limit the angular displacement between the camshaft and the crankshaft. The planetary gear stop 13 is one implementation of a range-limiting element. The planetary gear stop 13 engages a portion of the planetary gear assembly 14 and prevents further angular displacement between the camshaft and the crankshaft in both an advancing direction and a retarding direction. However, the planetary gear stop 13 can be implemented in a number of different ways. For example, rather than existing as a fixed protuberance extending radially-inwardly from the sprocket 12, the planetary gear stop(s) can move. For example, in one implementation the planetary gear stop can be an element that fits into a pocket of the camshaft ring gear such that the planetary gear stop moves to engage an element included on the planetary gear assembly. In one implementation, the planetary gear stop can pivot about an axis or can slide radially-inwardly or radially-outwardly to engage or disengage the planetary gear assembly 14. A variety of different planetary gear stops are described in U.S. patent application Ser. No. 15/635,281, the entirety of which is incorporated by reference.

In the embodiment presented here, the planetary gear assembly 14 includes planet gears 24. A sun gear 22 is driven by an electric motor 23 for rotation about the axis $X_1$. The sun gear 22 engages with the planet gears 24 and has a set of teeth 32 at its exterior that makes direct teeth-to-teeth meshing with the planet gears 24. In different examples, the set of teeth 32 can include twenty-six individual teeth, thirty-seven individual teeth, or some other quantity of teeth spanning continuously around the circumference of the sun gear 22. A skirt 34 in the shape of a cylinder spans from the set of teeth 32. As described, the sun gear 22 is an external spur gear, but could be another type of gear. The electric motor 23 includes a stator and a rotor (not shown). The rotor can be coupled to a motor shaft 100 to prevent angular movement of the rotor relative to the motor shaft 100. Electric current can be received by windings included with the stator to induce rotational movement of the rotor relative to the stator. The rotational movement of the rotor is communicated to the motor shaft 100. In one implementation, the motor shaft 100 can include an inner diameter 114 (shown in FIGS. 6 and 7) and an outer diameter such that the shaft 100 is tubular. A torsion gimbal 110 can be coupled to a distal end of the motor shaft 100, extending within the inner diameter 114 of the motor shaft 100, while an opposite end of the gimbal shaped as a key 102 can pivotably engage the sun gear 22. The key 102 can be shaped to engage the sun gear 22 via a slot 126 and transmit rotation movement from the motor shaft 100 to the planetary gear assembly 14. However, it should be appreciated that in other implementations, the key 102 can engage an input of the planetary gear assembly differently. For example, the key could be welded or otherwise coupled to the input of the planetary gear assembly. This will be discussed in more detail below with respect to FIGS. 4-7.

The planet gears 24 rotate about their individual rotational axes $x_2$ when in the midst of bringing the engine's camshaft among advanced and retarded angular positions. When not advancing or retarding, the planet gears 24 revolve together around the axis $x_1$ with the sun gear 22 and with the ring gears 26, 28. In the embodiment presented here, there are a total of three discrete planet gears 24 that are similarly designed and constructed with respect to one another, but there could be other quantities of planet gears such as one, two, four or six. However many there are, each of the planet gears 24 can engage with first and second ring gears 26, 28, included with the sprocket 12 and the plate 16, respectively. Each planet gear 24 can have a set of teeth 60 along its exterior for making direct teeth-to-teeth meshing with the ring gears 26, 28. In different examples, the teeth 60 can include twenty-one individual teeth, or some other quantity of teeth spanning continuously around the circumference of each of the planet gears 24. To hold the planet gears 24 in place and support them, a carrier assembly 62 can be provided. The carrier assembly 62 can have different designs and constructions. In the embodiment presented in the figures, the carrier assembly 62 includes a first carrier plate 64 on one side, a second carrier plate 66 on the other side, and cylinders 68 that serve as a hub for the rotating planet gears 24. Planet pins or bolts 70 can be used with the carrier assembly 62. It should be appreciated that other implementations of the planetary gear assembly are possible and that term should be understood to include other such implementations, such as one using an eccentric shaft and a compound planetary gear or another that uses a harmonic drive. Implementations having one ring gear and a planet gear attached to a camshaft via a coupling are possible as well.

The first ring gear 26 receives rotational drive input from the sprocket 12 so that the first ring gear 26 and sprocket 12 rotate together about the axis $x_1$ in operation. The first ring gear 26 can be a unitary extension of the sprocket 12—that is, the first ring gear 26 and the sprocket 12 can together form a monolithic structure. The first ring gear 26 has an annular shape, engages with the planet gears 24, and has a set of teeth 72 at its interior for making direct teeth-to-teeth meshing with the planet gears 24. In different examples, the teeth 72 can include eighty individual teeth, or some other quantity of teeth spanning continuously around the circumference of the first ring gear 26. In the embodiment presented here, the first ring gear 26 is an internal spur gear, but could be another type of gear.

The second ring gear 28 transmits rotational drive output to the engine's camshaft about the axis $x_1$. In this embodiment, the second ring gear 28 drives rotation of the camshaft via the plate 16. The second ring gear 28 and plate 16 can be connected together in different ways, including by a cutout-and-tab interconnection, press-fitting, welding, adhering, bolting, riveting, or by another technique. In embodiments not illustrated here, the second ring gear 28 and the plate 16 could be unitary extensions of each other to make a monolithic structure. Like the first ring gear 26, the second ring gear 28 has an annular shape, engages with the planet gears 24, and has a set of teeth 74 at its interior for making direct teeth-to-teeth meshing with the planet gears. In different examples, the teeth 74 can include seventy-seven individual teeth, or some other quantity of teeth spanning continuously around the circumference of the second ring gear 28. With respect to each other, the number of teeth between the first and second ring gears 26, 28 can differ by a multiple of the number of planet gears 24 provided. So, for instance, the teeth 72 can include eighty individual teeth, while the teeth 74 can include seventy-seven individual teeth—a difference of three individual teeth for the three planet gears 24 in this example. In another example with six planet gears, the teeth 72 could include seventy individual teeth, while the teeth 74 could include eighty-two individual teeth. Satisfying this relationship furnishes the advancing and retarding capabilities by imparting relative rotational movement and relative rotational speed between the first and second ring gears 26, 28 in operation. In the embodiment presented here, the second ring gear 28 is an internal spur gear, but could be another type of gear. The plate 16 includes a central aperture 76 through which a center bolt 78 passes to fixedly attach the plate 16 to the camshaft. In addition, the plate 16 is also secured to the sprocket 12 with a snap ring 80 that axially constrains the planetary gear assembly 14 between the sprocket 12 and the plate 16.

Together, the two ring gears 26, 28 constitute a split ring gear construction for the camshaft phaser 10. However, it should be appreciated that other camshaft phaser designs can be used with the cushioned stops. For example, the camshaft phaser could be implemented using an eccentric shaft, a compound planet gear, and two ring gears. Or the camshaft phaser could include more than two ring gears. For instance, the camshaft phaser 10 could include an additional third ring gear for a total of three ring gears. Here, the third ring gear could also transmit rotational drive output to the engine's camshaft like the second ring gear 28, and could have the same number of individual teeth as the second ring gear.

Turning to FIGS. 4-7, an implementation of a torque-limiting torsion gimbal 110 is shown for connecting the motor shaft 100 of the electric motor 23 to the planetary gear assembly 14. A rotor 112 of the electric motor 23 includes an inner diameter that engages an outer diameter of the motor shaft 100. The motor shaft 100 can be frictionally fit into the inner diameter of the rotor or otherwise coupled to prevent the angular displacement of the rotor 112 relative to the motor shaft 100.

Figure 4:
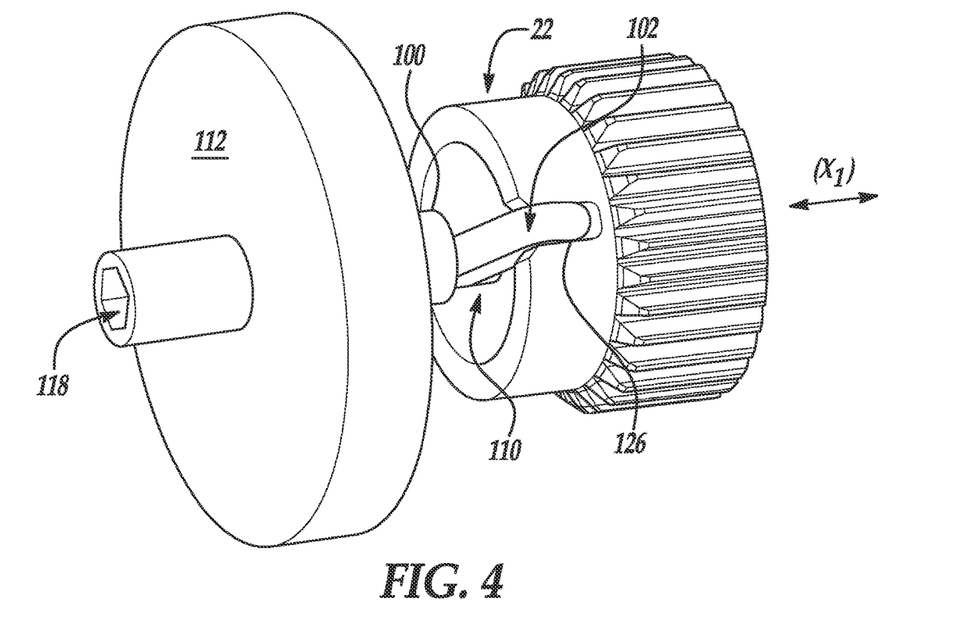
FIG. 4 is a perspective view depicting an implementation of an elongated torque-limiting torsion gimbal.
Figure 5:
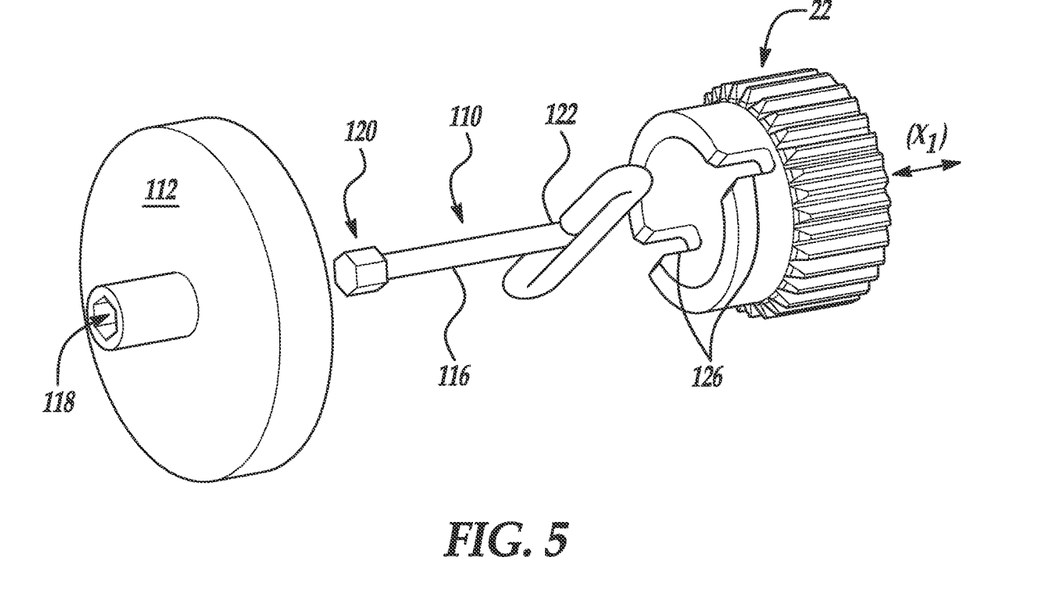
FIG. 5 is an exploded perspective view depicting an implementation of an elongated torque-limiting torsion gimbal.
Figure 6:
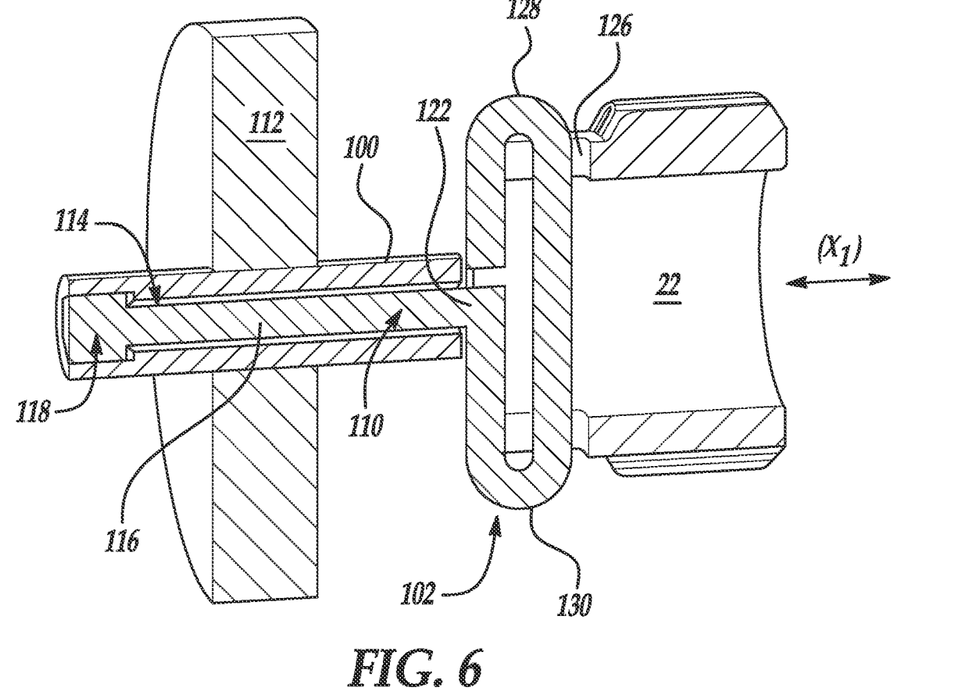
FIG. 6 is a cross-sectional view depicting an implementation of an elongated torque-limiting torsion gimbal.

The torsion gimbal 110 includes an elongated body 116 that extends from an end of the motor shaft 100 of the electric motor 23 to an input of a gearbox of the camshaft phaser, such as the sun gear 22. In this implementation, the motor shaft includes an inner diameter so that the torsion gimbal 110 can be received within the motor shaft 100 such that the torsion gimbal 110 is at least partially concentric to the shaft 100. At one end of the elongated body 116, an angular-displacement-resistant end 118 of the motor shaft 100 can mechanically engage an angular-displacement-resistant end 120 of the torsion gimbal 110. In this implementation, the angular-displacement-resistant end 118 can include a hexagonal cross-sectional shape that receives and engages with a similarly-shaped end 120 of the torsion gimbal 110. The angular-displacement-resistant end 118, as it engages with the similarly shaped end 120, can prevent the angular displacement of the torsional gimbal 110 relative to the shaft 100. It should be appreciated that the angular-displacement-resistant end can be implemented in other ways, such as by welding the end of the torsion gimbal to the motor shaft. The elongated body 116 can be sized and shaped to define an amount of angular deflection of the rotor 112 relative to the sun gear 22. For instance, the length of the elongated body 116, the diameter of the elongated body 116, the material of the elongated body 116, and/or the cross-sectional shape of the elongated body 116 can be specified to define the amount of angular deflection.

At the opposite end 122 of the elongated body 116, the key 102 can be shaped to be received within and engage the slot 126 at the input of the planetary gear assembly 14 of the phaser 10 and transmit torque from the electric motor 100 to the assembly 14. The key 102 can be shaped in a variety of different forms, and in this implementation includes a first wing 128 and a second wing 130 that each extend radially outwardly from the axis of planetary gear assembly rotation ($x_1$). As each wing 128, 130 engages a portion of the slot 126, the motor shaft 100 and electric motor 23 can be angularly displaced relative to the axis of planetary gear assembly rotation ($x_1$) while still maintaining functional operation and minimizing friction and vibration. In this implementation, the torsional gimbal 110 can be formed from a unitary metal wire that is bent at certain axial points to form the first wing 128 and the second wing 130.

Figure 7:
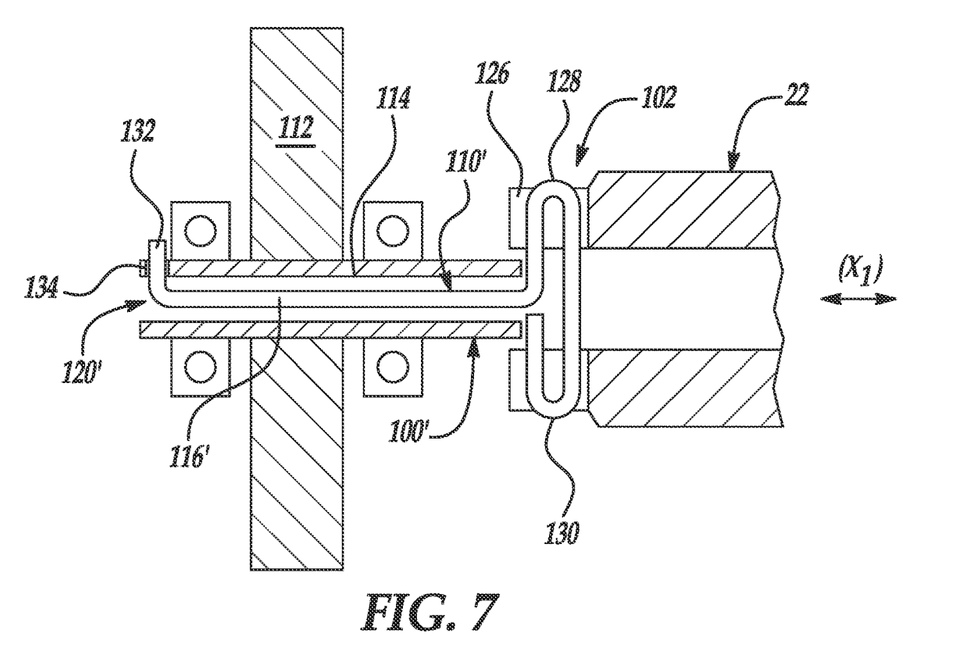
FIG. 7 is a cross-sectional view depicting another implementation of an elongated torque-limiting torsion gimbal.

FIG. 7, depicts another implementation of the torsional gimbal 110'. The torsional gimbal 110' includes an angular-displacement-resistant end 120' that can be formed from a portion of the elongated body 116' that is bent substantially perpendicularly relative to the body 116'. The angular-displacement-resistant end 120' can include a tab 132 having a diameter that substantially matches or is slightly smaller than the width of a notch 134 in a distal end of the motor shaft 100'. The tab 132 can engage the notch 134 to prevent the angular displacement of the torsional gimbal 110' relative to the motor shaft 100'.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A torque-limiting torsion gimbal for connecting an electric motor to a camshaft phaser, comprising:
   an elongated body configured to extend from an end of a motor shaft of the electric motor to an input of a planetary gear assembly of the camshaft phaser;
   an angular-displacement-resistant end of the elongated body configured to engage an end of the motor shaft; and
   a key, positioned at another end of the elongated body opposite to the angular-displacement-resistant end, and configured to engage the input of the planetary gear assembly of the camshaft phaser to transmit torque from the electric motor to the planetary gear assembly, wherein the elongated body prevents an angular displacement of the motor shaft relative to the input of the planetary gear assembly and permits the angular displacement of the motor shaft relative to the input of the planetary gear assembly when a mechanical stop of the camshaft phaser is engaged.

2. The torque-limiting torsion gimbal recited in claim 1, wherein the key permits an axis of rotation of the motor shaft to deviate angularly from an axis of rotation of the planetary gear assembly.

3. The torque-limiting torsion gimbal recited in claim 1, wherein the angular-displacement-resistant end of the elongated body includes a hexagonal cross-section.

4. The torque-limiting torsion gimbal recited in claim 1, wherein the angular-displacement-resistant end of the elongated body includes a perpendicularly-bent section of the elongated body.

5. The torque-limiting torsion gimbal recited in claim 1, wherein the motor shaft includes an inner diameter and an outer diameter and the elongated body is received within the inner diameter of the motor shaft and is concentric to the motor shaft.

6. The torque-limiting torsion gimbal recited in claim 1, wherein the key includes a first wing and a second wing each formed from a section of the elongated body and extending radially away from an axis of motor shaft rotation.

7. The torque-limiting torsion gimbal recited in claim 1, further comprising the camshaft phaser.

8. The torque-limiting torsion gimbal recited in claim 7, wherein the planetary gear assembly includes a sun gear and a plurality of planet gears.

9. The torque-limiting torsion gimbal recited in claim 1, further comprising a slot at the input of the planetary gear assembly that receives the key.

\* \* \* \* \*